(12) United States Patent
Sprainis et al.

(10) Patent No.: US 7,981,348 B2
(45) Date of Patent: Jul. 19, 2011

(54) METHOD OF MAKING ELASTOMERIC PAD FOR A COMPRESSIBLE ELASTOMERIC SPRING

(75) Inventors: Ronald J. Sprainis, Springfield, OR (US); Michael E. Ring, Saint John, IN (US); Bradley Anderson, Des Plaines, IL (US); Jonathon Marlow, Hobart, IN (US)

(73) Assignee: WABTEC Holding Corp., Wilmerding, PA (US)

( * ) Notice: Subject to any disclaimer, the term of this patent is extended or adjusted under 35 U.S.C. 154(b) by 267 days.

(21) Appl. No.: 12/150,925

(22) Filed: May 1, 2008

(65) Prior Publication Data
US 2008/0272517 A1     Nov. 6, 2008

Related U.S. Application Data

(60) Provisional application No. 60/926,987, filed on May 1, 2007.

(51) Int. Cl.
    *B29C 43/18*     (2006.01)
(52) U.S. Cl. ........ 264/320; 264/319; 264/274; 264/248; 264/249; 264/273
(58) Field of Classification Search .......... 264/319–320, 264/273–274, 248–249, 265
See application file for complete search history.

(56) References Cited

U.S. PATENT DOCUMENTS

| 3,290,919 | A | * | 12/1966 | Malinak et al. | ............ 72/453.05 |
|---|---|---|---|---|---|
| 4,198,037 | A | | 4/1980 | Anderson | |
| 5,335,403 | A | | 8/1994 | Jensen | |
| 5,351,844 | A | | 10/1994 | Carlstedt | |
| 6,386,461 | B1 | * | 5/2002 | Wildgoose | ............ 238/283 |
| 2006/0043662 | A1 | * | 3/2006 | Blake | ............ 269/249 |

FOREIGN PATENT DOCUMENTS

| EP | 971401 A2 | * | 1/2000 |
|---|---|---|---|
| SU | 1490338 | | 6/1989 |
| SU | 1670225 | | 8/1991 |
| SU | 1719741 | | 3/1992 |

* cited by examiner

*Primary Examiner* — Christina Johnson
*Assistant Examiner* — Xue Liu
(74) *Attorney, Agent, or Firm* — James Ray & Assoc

(57) ABSTRACT

A method of making a compressible elastomeric pad from a preselected polymer material includes the steps of providing a preform including a substantially solid body having a predetermined cross-section disposed normal to a central axis of the preform and a pair of axial ends, each having a substantially flat surface disposed normal to the central axis and a central socket formed within at least one substantially flat surface. Next, providing a pair of forming plates, at least one of the pair of forming plates having a raised annular ring and an axially aligned cavity provided on one surface thereof. Then, positioning the preform between the pair of forming plates and axially aligning the exterior peripheral edge of the annular ring with a peripheral edge of a respective central socket. Finally, forming the pad and removing the pad from engagement with the pair of forming plates.

19 Claims, 2 Drawing Sheets

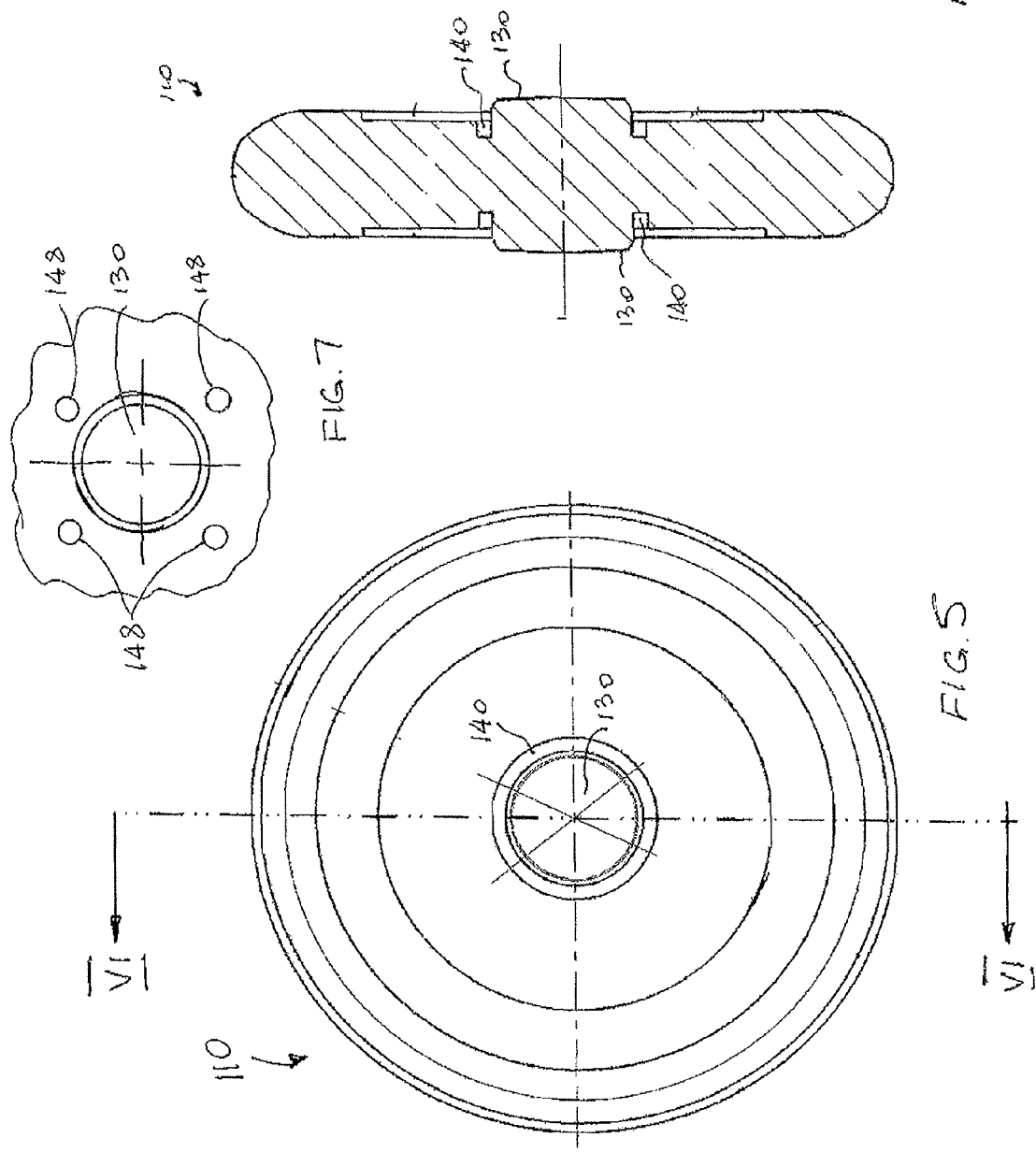

METHOD OF MAKING ELASTOMERIC PAD FOR A COMPRESSIBLE ELASTOMERIC SPRING

CROSS-REFERENCE TO RELATED APPLICATIONS

This application is related to and claims priority from Provisional Patent Application Ser. No. 60/926,987 filed on May 1, 2007. This application is further closely related to co-pending U.S. Ser. No. 12/150,809 entitled "Compressible Elastomeric Spring", to co-pending U.S. Ser. No. 12/150,926 entitled "Plate For A Compressible Elastomeric Spring", to co-pending U.S. Ser. No. 12/150,929 entitled "Method of Making Compressible Elastomeric Spring", to co-pending U.S. Ser. No. 12/150,928 entitled "Elastomeric Pad For A Compressible Elastomeric Spring", to co-pending U.S. Ser. No. 12/150,777 entitled "Combination Yoke and Elastomeric Draft Gear", to co-pending U.S. Ser. No. 12/150,808 entitled "Combination Yoke and Elastomeric Draft Gear Having A Friction Mechanism", to co-pending U.S. Ser. No. 12/150,927 entitled "Elastomeric Draft Gear Having A Housing", filed concurrently herewith. These applications are being assigned to the assignee of the present invention and the disclosures of these co-pending applications are hereby incorporated by reference thereto.

FIELD OF THE INVENTION

The present invention relates, in general, to compressible elastomeric springs and, more particularly, this invention relates to a compressible elastomeric pad employable in the elastomeric compressible spring and, yet more particularly, the instant invention relates to a method of making such elastomeric pad.

BACKGROUND OF THE INVENTION

Copolyester polymers have been extensively used in elastomeric springs or pads installed between a pair of metal plates for absorbing energy. One such polymer is manufactured under trademark HYTREL by E.I. DuPont de Nemours & Co. of Wilmington, Del. As is well known, the general method of making the spring first begins with the step of processing such polymer into what is commonly referred to as a block or a preform of a substantially solid body and then with the step of precompressing the block or preform into a generally disk-shaped spring or pad under axial forces applied thereto an extent greater than thirty percent of its original axial height. After the axial precompression force is removed, the spring recovers to its normal operating height (thickness) which is smaller than the original height of the preform but is greater than the precompressed height. The precompressed height is also commonly referred to as a "solid height". U.S. Pat. No. 4,198,037 issued to Anderson illustrates one type of such method wherein the preform is casted as a cylindrical block having a central projection formed on one axial end and a central socket formed on an opposed axial end. Anderson is particularly concerned about operability of such copolyester material in a compression mode and finds that the optimum precompression rate of the original block or preform is about fifty percent. The spring is then positioned between a pair of metal plates and precompressed again to interlock the socket and projection with complimentary elements provided within the metal plates in order to form the final spring operable for absorbing the energy. In U.S. Pat. No. 5,351,844 Carlstedt provides a preform which is molded from an elastomer with a raised projection at each axial end.

However, as there has been a continuing desire for increasing the energy that can be absorbed by the spring, particularly when the spring is used on railway vehicles, there is a need for additional improvements in a method of making compressible elastomeric springs.

SUMMARY OF THE INVENTION

The present invention provides a method of making a compressible elastomeric pad from a preselected polymer material. The method includes the step of providing a preform including a substantially solid body having a predetermined cross-section disposed normal to a central axis of the preform and a pair of axial ends, each of the pair of axial ends having each of a substantially flat surface disposed normal to the central axis and a central socket formed within at least one substantially flat surface. Next, providing a pair of forming plates, at least one of the pair of forming plates having a material displacement means at least one of formed integral with and secured to one surface thereof. Then, positioning the preform between the pair of forming plates. Axially aligning each material displacement means with a respective central socket. Next, forming the pad. Finally, removing the pad from engagement with the pair of forming plates.

OBJECTS OF THE INVENTION

It is, therefore, one of the primary objects of the present invention to provide a method of making a compressible elastomeric pad from a copolyester polymer material that can be employed in a compressible elastomeric springs.

Another object of the present invention is to provide a method of making a compressible elastomeric pad for a buffer apparatus of a railway vehicle that can absorb higher energy than the pads presently in use.

Yet another object of the present invention is to provide a method of making a compressible elastomeric pad that enables ease of attachment to metal plates.

A further object of the present invention is to provide a method of making a compressible elastomeric pad that evenly distributes the stresses over the entire surface of the axial end of such pad.

An additional object of the present invention is to provide a method of making a compressible elastomeric pad by a cold forming process.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE DRAWINGS

FIG. 5 is a planar view of a compressible elastomeric pad formed by the manufacturing step of FIG. 3;

FIG. 6 is a cross-sectional elevation view of the compressible elastomeric pad of FIG. 5; and FIG. 7 is a partial planar view of a compressible elastomeric pad formed by the manufacturing step of FIG. 4.

BRIEF DESCRIPTION OF THE VARIOUS EMBODIMENTS OF THE INVENTION

Figure 1:
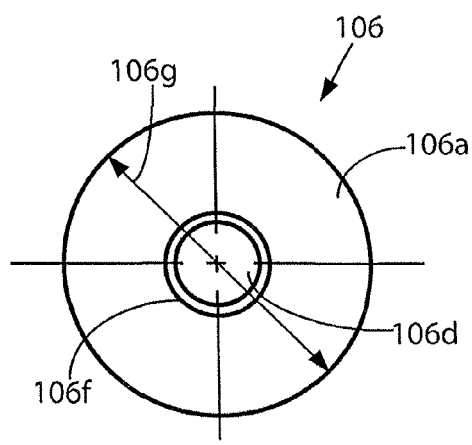
FIG. 1 is a planar view of the preform constructed in accordance with a presently preferred embodiment of the invention.

Prior to proceeding to the more detailed description of the present invention, it should be noted that, for the sake of clarity and understanding, identical components which have identical functions have been identified with identical reference numerals throughout the several views illustrated in the drawing figures.

The present invention provides a method of making a compressible elastomeric pad, generally designated as 110. The various structures of the pad 110 are detailed in the co-pending U.S. Ser. No. 12/150,928 entitled "Elastomeric Pad For A Compressible Elastomeric Spring". The presently preferred structure of the pad 110 is disclosed in FIGS. 7-8 of this co-pending application.

Figure 2:
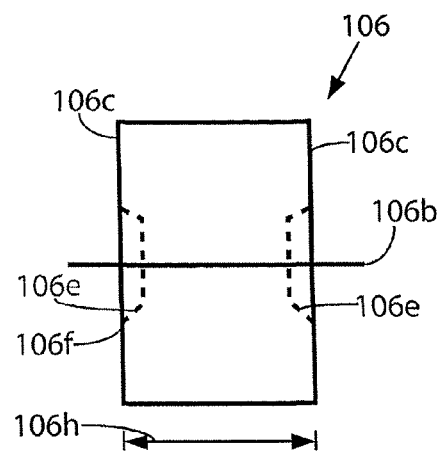
FIG. 2 is a side elevation view of the preform of FIG. 1.

The method begins with the step of providing a preform, generally designated as 106, and shown in FIGS. 1-2. The preform 106 has a substantially solid body 106a having a predetermined cross-section disposed normal to a central axis 106b of the preform and a pair of axial ends 106c. Each of the pair of axial ends 106c has a substantially flat surface disposed normal to the central axis 106b. The method includes the step of selecting material, such as at least one of a copolyester polymer and a copolyamide material, and casting or injection molding the preform 106 from such material. It is presently preferred to cast the preform 106 from a copolyester elastomer. Such copolyester elastomer is preferably of the type as manufactured by E.I. DuPont de Nemours & Co. of Wilmington, Del. under the general HYTREL trademark and, more specifically, under the Hytrel 5556 brand. Such virgin Hytrel 5556 material is characterized by an ultimate tensile strength of about 5,800 pounds per square inch (PSI). The virgin Hytrel 5556 is modified during extrusion process to enhance its stability.

In the presently preferred embodiment of the invention, to make the pad 110 of FIGS. 7-8 having projections 130 and grooves 140, the preform 106 is provided with a central socket 106d that is formed in each of the pair of axial end 106c. The method also includes the step of tapering a peripheral surface 106e of the socket 106d inwardly at a predetermined angle relative to the central axis 106b in order to improve concentricity of the resulting projection 130 of the pad 110. The method includes the additional step of forming the body 106a with a circular cross-section disposed normal to the axis 106b in order to equally distribute lateral forming stresses.

Then, the method includes the step of providing a pair of forming plates, at least one of the pair of forming plates 400 having a material displacement means being at least one formed integral with and secured to one surface 402 thereof. Again to make the pad 110 of FIGS. 7-8, the material displacement means is provided as a raised annular ring 404 and a cavity 406 axially aligned with the raised annular ring 404. The raised annular ring 404 and the cavity 406 are sized so that the volume of the resulting projection 130 is substantially equal to the volume of the resulting groove 140 of the pad 110.

This arrangement has been found advantageous in forming the projection 130 in a "neutral displacement manner" by equalizing the forming pressure over the entire surface of the axial end 106c. It has been discovered prior to employing raised annular ring 404 and the cavity 406, that the center projection 130 experienced higher forming stresses than the peripheral portions of the pad 110.

Next, the method includes the step of positioning the preform 106 between the pair of forming plates 400 by opposing each of the pair of axial ends 106c about the first surface 402 of a respective one of the pair of forming plate 400.

The method also includes the step of axially aligning each raised annular ring 404 with a respective central socket 106d and, more specifically, aligning the outer peripheral edge 408 of the raised annular ring 404 with a peripheral edge 106f of the respective socket 106d.

After the preform 106 and the plates 400 have been axially aligned, the method includes the step of cold forming the pad 110 to a predetermined orientation of long molecular chains of the modified copolyester polymer. The cold forming step includes the step of applying, in a conventional manner, a predetermined force F along the axis 106b to a second opposed surface 410 of one of the pair of forming plates 400. Such force precompresses the preform 106 to at least one of a predetermined solid height of the pad 110 and a predetermined shape factor. After the pad 110 is precompressed, the applied force is released.

The solid height and the shape factor of the pad 110 are predetermined based on the energy absorption requirement and space envelop of a specific application. The following discussion will be concerned with the pad 110 in use within a draft gear assembly of a railway vehicle for absorbing buff and draft impact forces and, more particularly, the draft gear assembly disclosed in the co-pending U.S. Ser. No. 12/150,777 entitled "Combination Yoke and Elastomeric Draft Gear". Such draft gear assembly is installed into a standard American Association of Railroads (AAR) draft gear pocket of about 9.0 inches in height and is limited by AAR presently mandated travel of about 3.25 inches during cushioning of buff dynamic impact forces. In order to improve energy absorption capacity of the draft gear assembly 70 while meeting AAR requirements, the preform 106 has a diameter 106g of about 4.9 inches and the uncompressed height 106h of about 2.45 inches. The precompression rate to which the preform 106 is precompressed and the molecular chains of the modified copolyester material are oriented is greater than fifty percent. The optimum precompression rate is greater than about seventy percent and has been found to be about seventy three percent. The presently preferred shape factor of the pad 110 is about 3.33. With such shape factor and precompression rate, the diameter of the pad 110 at its compressed solid height condition is about 8.9 inches meeting the mandated draft gear pocket height. It also has been found that such precompression of the preform 106 requires application of the axial force F to between 750,000 pounds and about 800,000 pounds.

Figure 3:
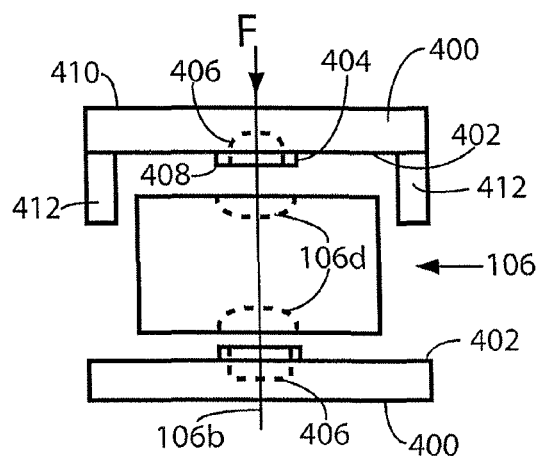
FIG. 3 is an elevation view of the preform of FIG. 1 and forming plates arranged to illustrate manufacturing step of precompressing the preform of FIG. 1.
Figure 4:
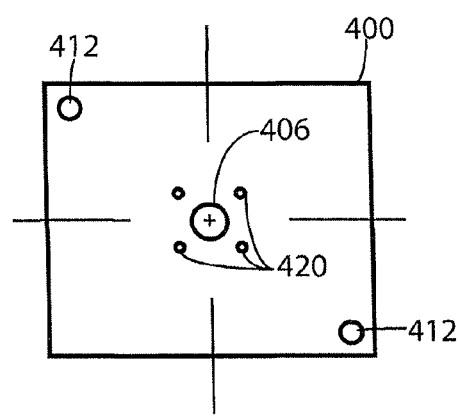
FIG. 4 is a planar view of a forming plate constructed in accordance with another embodiment of the present invention.

In accordance with another embodiment of the invention, the forming plates 400 may be provided with a plurality of elongated pins 420 shaped to form the pockets 148 of the pad 110 of FIGS. 3-4 as well as with the combination of pins 420 and cavity 406 to form a combination of the projection 130 and the pockets 148.

The method also includes an optional step of providing at least one stop 412 and engaging opposed ends of the stop with a respective one of the pair of forming plates 400 for controlling compression of the preform 106.

Finally, the method includes the step of removing the pad 110 from engagement with the pair of forming plates 400.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. A method of making a compressible elastomeric pad from a preselected polymer material, said method comprising the steps of:
   (a) providing a preform including a substantially solid body having a predetermined cross-section disposed normal to a central axis of said preform and a pair of axial ends, each of said pair of axial ends having each of a substantially flat surface disposed normal to said central axis and a central socket provided within at least one substantially flat surface;
   (b) providing a pair of forming plates, at least one of said pair of forming plates having a raised annular ring at least one of formed integral with and secured to one surface thereof;
   (c) positioning said preform between said pair of forming plates;
   (d) axially aligning said raised annular ring with a respective central socket;
   (e) forming said pad having an axial projection extending outwardly from said at least one substantially flat surface of said preform having said socket provided therewithin; and
   (f) removing said pad from engagement with said pair of forming plates.

2. The method, according to claim 1, wherein said method includes the additional step of casting said preform with a circular cross-section disposed normal to said axis.

3. The method, according to claim 1, wherein said method includes the additional step of tapering a peripheral surface of said socket inwardly at a predetermined angle relative to said central axis of said preform.

4. The method, according to claim 1, wherein step (b) includes the step of providing each of said pair of forming plates with said raised annular ring and a cavity axially aligned with said raised annular ring.

5. The method, according to claim 4, wherein step (d) includes the step of aligning an outer peripheral edge of said raised annular ring with a peripheral edge of said respective socket.

6. The method, according to claim 1, wherein said method includes the step of selecting a polymer material to be cast.

7. The method, according to claim 6, wherein said method includes the step of selecting said polymer material from at least one of a copolyester polymer and a copolyamide material.

8. The method, according to claim 7, wherein step (e) includes the steps of applying a predetermined force axially to an exposed surface of one of said pair of forming plates, axially precompressing said preform to a predetermined solid height of said pad, axially displacing material of said preform into an opening of said annular ring and releasing said applied force.

9. The method, according to claim 8, wherein step (e) includes the step of precompressing said preform to a predetermined orientation of long molecular chains of said at least one of said copolyester polymer and said copolyamide material.

10. The method, according to claim 8, wherein step (e) includes the step of precompressing said pad to shape factor of about 3.33.

11. The method, according to claim 8, wherein step (e) includes the step of applying said axial force to between about 750,000 pounds and about 800,000 pounds.

12. The method, according to claim 8, wherein step (e) includes the additional steps of providing at least one stop and engaging opposed ends of said stop with a respective one of said pair of forming plates for controlling precompression of said preform.

13. The method, according to claim 6, wherein said method includes the step of selecting said polymer material as a copolyamide material.

14. A method of making a compressible elastomeric pad from a preselected polymer material, said method comprising the steps of:
   (a) providing a preform including a substantially solid body having a predetermined cross-section disposed normal to a central axis of said preform and a pair of axial ends, each of said pair of axial ends having each of a substantially flat surface disposed normal to said central axis and a central socket formed within said substantially flat surface;
   (b) providing a pair of forming plates, each of said pair of forming plates having each of a raised structure disposed on and extending outwardly from one surface thereof and a cavity formed within said one surface in axial alignment with said raised structure;
   (c) positioning said preform between said pair of forming plates so that said each of said pair of axial ends is opposing said one surface a respective forming plate;
   (d) axially aligning each raised structure with a respective central socket;
   (e) forming said pad having a pair of axial annual projections, each of said pair of axial annular projections rising outwardly from a respective surface of said preform having said socket provided therewithin; and
   (f) removing said pad from engagement with said pair of forming plates.

15. The method, according to claim 14, wherein the step (b) includes the step of providing said raised structure as an annular ring.

16. The method, according to claim 14, wherein the step (e) includes the step of forming a pair of annular grooves, each of said pair of annular grooves surrounding a respective raised annular projection.

17. The method, according to claim 16, wherein the method includes the step of substantially equalizing a volume of said raised annular projection with a volume of said annular groove.

18. A method of making a compressible elastomeric pad from a preselected polymer material, said method comprising the steps of:
   (a) providing a preform including a substantially solid body having a predetermined cross-section disposed normal to a central axis of said preform and a pair of axial ends, each of said pair of axial ends having each of a substantially flat surface disposed normal to said central axis and a central socket formed within at least one substantially flat surface;
   (b) providing a pair of forming plates, at least one of said pair of forming plates having each of a raised structure at least one of formed integral with and secured to one surface thereof and a cavity formed within said one surface in axial alignment with said raised structure;

(c) positioning said preform between said pair of forming plates, (d) positioning an axial end of said preform having said central socket therewithin in an opposed relationship with said raise structure;

(e) axially aligning said raised structure with said central socket;

(f) forming said pad having an axial annual projection rising outwardly from said surface of said preform having said socket provided therewithin; and (g) removing said pad from engagement with said pair of forming plates.

19. The method, according to claim 18, wherein step (b) includes the steps of providing said each of said pair of forming plates with a predetermined plurality of elongated pins and positioning said predetermined plurality of elongated pins in a predetermined pattern and extending outwardly from a surface of said each forming plate.

* * * * *